US011878902B2

(12) United States Patent
Carson et al.

(10) Patent No.: US 11,878,902 B2
(45) **Date of Patent: *Jan. 23, 2024**

(54) SYSTEM AND METHOD FOR BEVERAGE LINE CLEANING

(71) Applicant: Breakwall Analytics, LLC, Cleveland, OH (US)

(72) Inventors: Justin Carson, Medina, OH (US); Arthur J. Geigel, III, Medina, OH (US); Christopher Armenio, Medina, OH (US)

(73) Assignee: Drink Modern Technologies, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,883

(22) Filed: Jan. 26, 2023

(65) Prior Publication Data

US 2023/0166957 A1 Jun. 1, 2023

Related U.S. Application Data

(63) Continuation of application No. 17/205,429, filed on Mar. 18, 2021, now Pat. No. 11,591,204, which is a continuation of application No. 16/583,859, filed on Sep. 26, 2019, now Pat. No. 10,981,770, which is a (Continued)

(51) Int. Cl.
*B67D 1/07* (2006.01)
*B08B 9/032* (2006.01)

(52) U.S. Cl.
CPC .............. *B67D 1/07* (2013.01); *B08B 9/0321* (2013.01)

(58) Field of Classification Search
CPC ....... B67D 1/07; B08B 9/0321; B08B 9/0323; B08B 9/08; B08B 9/20; A47J 31/60
USPC ... 134/169 C, 166 C, 22.11, 22.12, 98.1, 18, 134/100.1, 22.18, 166 R, 169 R, 22.1, (Continued)

(56) References Cited

U.S. PATENT DOCUMENTS 1,981,611 A * 11/1934 Cappa .................. B08B 9/0323 137/607
2,645,379 A * 7/1953 Audia ...................... B67D 1/07 222/145.2

(Continued)

FOREIGN PATENT DOCUMENTS

DE 3642611 A1 6/1988
DE 3920046 A1 1/1991

(Continued)

*Primary Examiner* — David G Cormier
*Assistant Examiner* — Thomas Bucci
(74) *Attorney, Agent, or Firm* — TUCKER ELLIS LLP

(57) ABSTRACT

Systems and methods of the invention relate to cleaning a portion of a beverage line of a beverage distribution system based upon a signal received from a remote source. An administrative (also referred to as "admin") system can manage a cleaning system from a remote location in which a remote signal can drive a cleaning system and at least one or more electric valves within the beverage distribution system. A controller component (local to the beverage distribution system) can receive the remote signal from the admin system, wherein a cleaning system (e.g., via a cleaning line) or a dispensing system (e.g., via a hose) can be selected to enable a cleaning mode or a dispensing mode.

20 Claims, 9 Drawing Sheets

Related U.S. Application Data continuation of application No. 13/783,786, filed on Mar. 4, 2013, now Pat. No. 10,464,799.

(60) Provisional application No. 61/739,388, filed on Dec. 19, 2012.

(58) Field of Classification Search
USPC ........... 134/168 C; 222/148, 129.1, 1, 145.2, 222/399, 144.5, 132, 61
See application file for complete search history.

(56) References Cited

U.S. PATENT DOCUMENTS 3,036,741 A * 5/1962 Hilts ........................ B67D 1/07 134/168 C
3,945,411 A * 3/1976 Skoli ........................ B67C 3/001 134/169 C
4,527,585 A * 7/1985 Mirabile ............... B08B 9/0323 134/169 C
4,815,190 A 3/1989 Haba, Jr. et al.
4,941,593 A * 7/1990 Hicks .................... B08B 9/0323 134/169 C
5,090,440 A * 2/1992 Ladouceur ........... B67D 1/0831 137/240
5,601,101 A 2/1997 Grapes et al.
5,636,763 A * 6/1997 Furness ................ B67D 1/1245 222/61
5,762,096 A * 6/1998 Mirabile ............... B08B 9/0325 134/169 C
6,357,454 B1 3/2002 Yokota et al.
6,557,570 B1 5/2003 Gierbolini et al.
8,069,866 B2 12/2011 Moore et al.
10,464,799 B2 * 11/2019 Carson .................. B08B 9/0321
10,981,770 B2 * 4/2021 Carson .................. B08B 9/0321
11,591,204 B2 * 2/2023 Carson ..................... B67D 1/07
2003/0159447 A1 * 8/2003 Sergio ...................... B67D 1/07 62/331
2003/0183249 A1 * 10/2003 Nissinen .................. B67D 1/07 134/169 C
2004/0001906 A1 * 1/2004 Carhuff ................. B08B 9/0321 426/130
2004/0118291 A1 * 6/2004 Carhuff ................. A47J 31/401 99/275
2004/0245281 A1 * 12/2004 Oke ......................... B67D 1/07 222/1
2006/0113322 A1 * 6/2006 Maser .................. B67D 1/0878 222/129.1
2006/0169715 A1 * 8/2006 Emmendorfer ....... B08B 9/0325 222/59
2006/0175352 A1 * 8/2006 Emmendorfer ....... B08B 9/0325 222/1
2006/0186137 A1 * 8/2006 Till .......................... B67D 1/07 222/148
2006/0213928 A1 * 9/2006 Ufheil ..................... A47J 31/60 222/129.1
2007/0095859 A1 * 5/2007 Maser .................. B67D 1/0888 222/59
2007/0193610 A1 * 8/2007 Strothoff .................. B67D 1/07 134/166 C
2008/0163896 A1 * 7/2008 Ioannone ................ A47J 31/60 134/133
2008/0189078 A1 * 8/2008 Vok ...................... B67D 1/0831 702/188
2008/0223410 A1 * 9/2008 Molloy ................. B08B 9/0325 134/113
2009/0014464 A1 * 1/2009 Adbelmoteleb ..... B67D 1/0028 222/1
2010/0170916 A1 * 7/2010 Segers ..................... B67D 1/07 222/1
2010/0176147 A1 * 7/2010 Segers ................. B67D 1/0837 222/1
2011/0005407 A1 * 1/2011 Reyhanloo .......... A47J 31/4485 134/22.12
2011/0073618 A1 * 3/2011 Anderson ................ B67D 1/07 222/145.2
2013/0140328 A1 * 6/2013 Gates .................... A47J 31/469 134/22.18

FOREIGN PATENT DOCUMENTS

| | | | |
|---|---|---|---|
| DE | 4313292 | A1 | 10/1994 |
| EP | 0487214 | A1 | 5/1992 |
| FR | 2354829 | A1 | 1/1978 |
| FR | 2642997 | A1 | 8/1990 |
| GB | 1196912 | A | 7/1970 |
| WO | 95/12543 | A1 | 5/1995 |
| WO | 00/53346 | A1 | 9/2000 |
| WO | 2005/087397 | A1 | 9/2005 |

* cited by examiner

SYSTEM AND METHOD FOR BEVERAGE LINE CLEANING

CROSS-REFERENCE TO RELATED APPLICATIONS

This application is a continuation of and claims the benefit of U.S. Non-provisional application Ser. No. 17/205,429 filed Mar. 18, 2021 and entitled "SYSTEM AND METHOD FOR BEVERAGE LINE CLEANING." application Ser. No. 17/205,429 is a continuation of and claims the benefit of U.S. Non-provisional application Ser. No. 16/583,859, filed Sep. 26, 2019, and entitled "SYSTEM AND METHOD FOR BEVERAGE LINE CLEANING." application Ser. No. 16/583,859 is a continuation of and claims the benefit of U.S. Non-provisional application Ser. No. 13/783,786, filed Mar. 4, 2013, and entitled "SYSTEM AND METHOD FOR BEVERAGE LINE CLEANING." application Ser. No. 13/783,786 is a Non-provisional of and claims the benefit of U.S. Provisional Application Ser. No. 61/739,388, filed Dec. 19, 2012, and entitled "SYSTEM AND METHOD FOR BEVERAGE LINE CLEANING." The entireties of the aforementioned applications are incorporated herein by reference.

BACKGROUND

Technical Field

Embodiments of the subject matter disclosed herein relate to automatically cleaning a beverage line of a beverage distribution system from a remote source.

Discussion of Art

Beverages can be conveyed in pipes or ducts from a supply, such as a container, to an outlet (e.g., tap, spout, and the like) for dispensing purposes. Such arrangements can be found in bars, restaurants, hotels and associated industries, where the beverage is supplied in a pipeline (e.g., line, hose, tube, and the like) conveyed to a tap located adjacent to a bar or serving station. The pipeline can include ducts or pipes (also referred to as lines, hoses, or tubes) which carry such beverages. The pipeline is cleaned regularly to remove bacteriological build-up within the pipes or ducts. Conventionally, this is a tedious task based at least in part upon disassembly of the pipelines, passing a cleaning or flushing fluid there through, among others.

It may be desirable to have a system and method that differs from those systems and methods that are currently available.

BRIEF DESCRIPTION

In an embodiment, a beverage line cleaning system is provided. The beverage line cleaning system, that includes at least the following: a beverage container that stores a portion of beverage; a tap to dispense the portion of beverage; a hose that physically connects the tap to the beverage container via a connector on each end; a first electric valve physically proximate to the beverage container, the first electric valve is coupled in between the beverage container and the tap to select between the hose and a cleaning line; a second electric valve physically proximate to the tap, the second electric valve is coupled in between the beverage container and the tap to select between a spout of the tap and a drain; the cleaning line coupled to a cleaning system; and a controller component that is configured to receive a first remote signal that drives at least one of the first electric valve or the second electric valve.

In an embodiment, a beverage line cleaning system can be provided that includes at least the following: a first beverage container that stores a first portion of beverage; a second beverage container that stores a second portion of beverage; a first tap to dispense the first portion of beverage; a second tap to dispense the second portion of beverage; a first hose that physically connects the first tap to the first beverage container via a first connector on each end; a second hose that physically connects the second tap to the second beverage container via a second connector on each end; a first electric valve physically proximate to the first beverage container, the first electric valve is coupled in between the first beverage container and the first tap to select between the first hose and a first cleaning line; a second electric valve physically proximate to the second beverage container, the second electric valve is coupled in between the second beverage container and the second tap to select between the second hose and a second cleaning line; a connector that attaches to a portion of the first tap and a portion of the second tap to enable a flow therebetween and through the first hose and the second hose; the first cleaning line and the second cleaning line are coupled to a cleaning system; and a controller component that is configured to receive a first remote signal that drives at least one of the first electric valve or the second electric valve.

In an embodiment, a method of cleaning a beverage line from a remote location can be provided that includes at least one of the following: receiving a valve control signal at a beverage line system; controlling one or more electric valves within the beverage line system based on the valve control signal; receiving a cleaning control signal at the beverage line system; and performing a cleaning on a beverage line within the beverage line system based upon the cleaning control signal.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
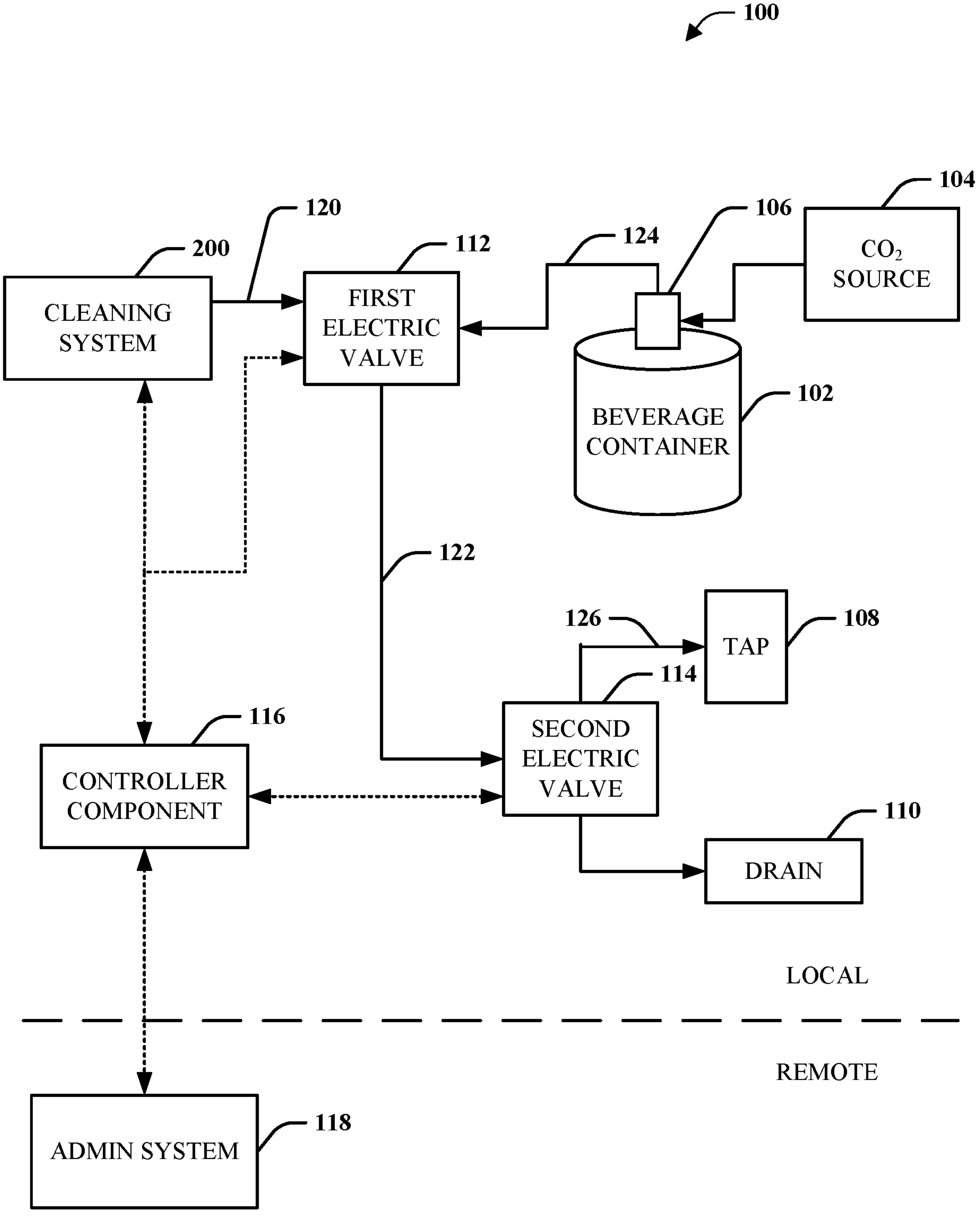
FIG. 1 is an illustration of an embodiment of a system for controlling a cleaning process for a beverage distribution system based on a remote signal.

Embodiments of the invention relate to methods and systems for cleaning a portion of a beverage line of a beverage distribution system based upon a signal received from a remote source. An administrative (also referred to as "admin") system can manage a cleaning system from a remote location in which a remote signal can drive a cleaning system and at least one or more electric valves within the beverage distribution system. A controller component (local to the beverage distribution system) can receive the remote signal from the admin system, wherein a cleaning system (e.g., via a cleaning line) or a dispensing system (e.g., via a hose) can be selected to enable a cleaning mode or a dispensing mode.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "beverage" as used herein can be defined as any consumable liquid such as drinks, soda, carbonated drinks, non-carbonated drinks, juice, energy drinks, soda pop, water, soda water, tonic, milk, beverages dispensed with CO2, beverages dispensed with a line or a hose, alcohol, beer, and the like. The term "container" as used herein can be defined as a liquid storage device that can contain, store, and/or transport, a portion of liquid. The term "rinsing water source" as used herein can be defined as a water source of any suitable temperature from a water company, a water line, a well, a reservoir, plumbing system, and the like. The term "clean" as used herein can be defined as including a cleaning and/or a sanitizing of a hose, a line, a tube, and the like. The term "cleaning solution source" as used herein can be defined as a system or container that provides cleaning material (e.g., liquid, gel, detergent, among others) that is used to sanitize and/or clean. The term "electric valve" as used herein can be defined as a valve that can be controlled with an electric signal, signal, wireless signal, and the like. The electric valve can be, but is not limited to, a solenoid valve.

FIG. 1 is an illustration of a system 100 for controlling a cleaning process for a beverage distribution system based on a remote signal. The system 100 can be a beverage line cleaning system for a beverage distribution system that includes at least one beverage container 102 that houses or stores a portion of beverage, a CO2 source 104, a connector 106, and a hose (hose with portions 124, 122, and 126, collectively referred to as "the hose 122") that connects the beverage container 102 to a tap 108. In an embodiment, the tap 108 can include a connector (not shown) and a spout (not shown but illustrated in FIG. 4). A portion of beverage can be dispensed via the hose 122 from the beverage container 102 to the tap 108 and into a glass or cup, wherein excess beverage dispensed or spilled can be captured by a drain 110.

The system 100 can include a first electric valve 112 and a second electric valve 114. The first electric valve 112 can be a valve that can select between two or more lines or hoses within the system 100. The first electric valve 112 can be in between the connector 106 and the tap 108, wherein the first electric valve 112 is proximate to the connector 106 and the beverage container 106. The first electric valve 112 can be in-line with the hose 122 in order to separate the hose 122 into a first portion 124 and a second portion 122. The first electric valve 112 can be configured to select between a cleaning mode (via a cleaning line 120 that connects to a cleaning system 200) or a dispensing mode (via the first portion of the hose 124 connected to the beverage container 102 via the connector 106).

Additionally, the second electric valve 114 can be a valve that can select between two or more lines or hoses within the system 100. The second electric valve 114 can be in between the beverage container 102 and the tap 108, wherein the second electric valve 114 is proximate to the tap 108. In an embodiment, the second electric valve 114 can be in-line with the hose 122 and in between the first electric valve 112 and the tap 108. The second electric valve 114 can be in-line with the hose 122 in order to separate the hose 122 into the second portion 122 and a third portion 126. The second electric valve 114 can be configured to select between a cleaning mode (via the drain 110) or a dispensing mode (via the tap 108).

The first electric valve and the second electric valve 114 can be controlled with a remote signal received from a remote source. In other words, a selection of a dispensing mode or a cleaning mode can be managed by a remote source that is not local to a location of the beverage distribution system. On a local side, the beverage distribution system can receive incoming communications from a remote source (as well as communicate outgoing communications to the remote source). In particular, an admin system 118 can be on a remote side and transmit and/or receive communications with the local side beverage distribution system. In an embodiment, a remote side is on a first network and a local side is on a disparate network, wherein the first network and the second network communicate via the Internet, a satellite, and the like.

The admin system 118 can communicate with a controller component 116 via a remote signal. Additionally, the controller component 116 can communicate with the admin system 118. The controller component 116 can be a standalone component (as depicted), incorporated into the cleaning system 200, or a combination thereof. The admin system 118 can communicate a first remote signal and/or a second remote signal, wherein the first remote signal and/or the second remote signal can control at least one of the first electric valve 112, the second electric valve 114, or a cleaning system 200. For instance, the first remote signal can drive at least one of the first electric valve 112 or the second electric valve 114 (wherein the signal can be referred to as a valve control signal). In another example, the second remote signal can drive the cleaning system 200 (wherein the signal can be referred to as a cleaning control signal. The controller component 116 can utilize the one or more remote signals from the admin system 118 to drive at least one of the first electric valve 112, the second electric valve 114, the cleaning system 200, and/or a cleaning controller component (not shown but discussed in FIG. 2).

Although system 100 depicts one beverage container 102 and one tap 108, it is to be appreciated that the system 100 can be employed with one or more beverage containers, one or more beverage distribution lines, one or more taps, one or more hoses, one or more cleaning systems, one or more CO2 sources, one or more drains, and the like. The system 100 illustrates a single line with a single tap 108 and beverage container 102 solely for the sake of brevity and the subject disclosure is not to be limited based on such example.

One or more lines (e.g., line 122, 124, and 126) are used to transfer beverage from containers (e.g., beverage container 102) to beverage dispensers in the form of, for instance, taps, spouts, dispensing guns, and the like (e.g., tap 108). The beverage container 102 can be kept in a beverage cellar or cooler (not shown), and the dispensers often take the form of taps on a bar or serving station. Beverage lines (also referred to as hose, tube, or pipe) may be several meters long, and are typically made from plastic tubing. Conventionally, plastic tubing of a line in use can build up off-white organic deposits rapidly on the inside surfaces. These organic deposits can be referred to as bio-film, wherein bio-film includes a mixture of proteins, complex carbohydrates, bacteria and yeast. If these deposits are allowed to build up and remain in a line, the taste of the beverage dispensed through the line is adversely altered by the action of bacteria and yeasts. In order to alleviate the buildup of bio-film, lines can be cleaned to reduce/remove organic deposits, thereby reducing the fobbing effect and ensuring that the organoleptic quality of the beverage is maintained. Fobbing can refer to the effect whereby the beverage becomes extremely frothy and cannot be delivered effectively from the dispenser (e.g., tap 108). The system 100 provides a technique in which to maintain integrity of a beverage distribution line within a beverage distribution system without dependency on a physical presence on-site.

In another embodiment, the system 100 can include a three-way switch in each line in order to clean individual lines or each line simultaneously. It is to be appreciated that any suitable switch can be utilized with the system 100. For instance, a four-way switch, a five-way switch, and the like can be employed. For instance, this can allow a draining of a line up front via a faucet drain (e.g., drain 110) or running through the lines to a drain associated with the cleaning system 200 (See FIG. 5 and solenoid drive component drain 502 discussed below).

In another embodiment, the tap 108 can be automatically controlled by a computing device or controller component 116. For instance, the controller component 116 can switch the tap 108 from a dispense mode to a cleaning mode with via the second electric valve 114 and/or an additional valve (not shown) incorporated or affixed to the tap 108. In such embodiment, the tap(s) 108 can be connected by hoses lining each other together using, for instance, at least one of a ball valve or a pinch solenoid to switch between the dispense mode (e.g., dispense beverage) and the cleaning mode (e.g., lines include cleaning solutions or liquids). In still another embodiment, the tap 108 can include at least one of a temperature sensor, a liquid sensor (e.g., to at least identify a type of liquid), and/or a meter component (e.g., capable of metering, tracking, counting an amount of liquid or beverage dispensed). A pouring spout of the tap 108 can be fabricated of antimicrobial tubing that is detachable in order to increase cleanliness. For instance, at an end of a serving period (e.g., dispensing beverage), the pouring spout of the tap 108 can be removed. Additionally, the tap 108 can communicate to the cleaning system 200 to verify a clean cycle is complete, performed up to defined parameters, among others.

Figure 2:
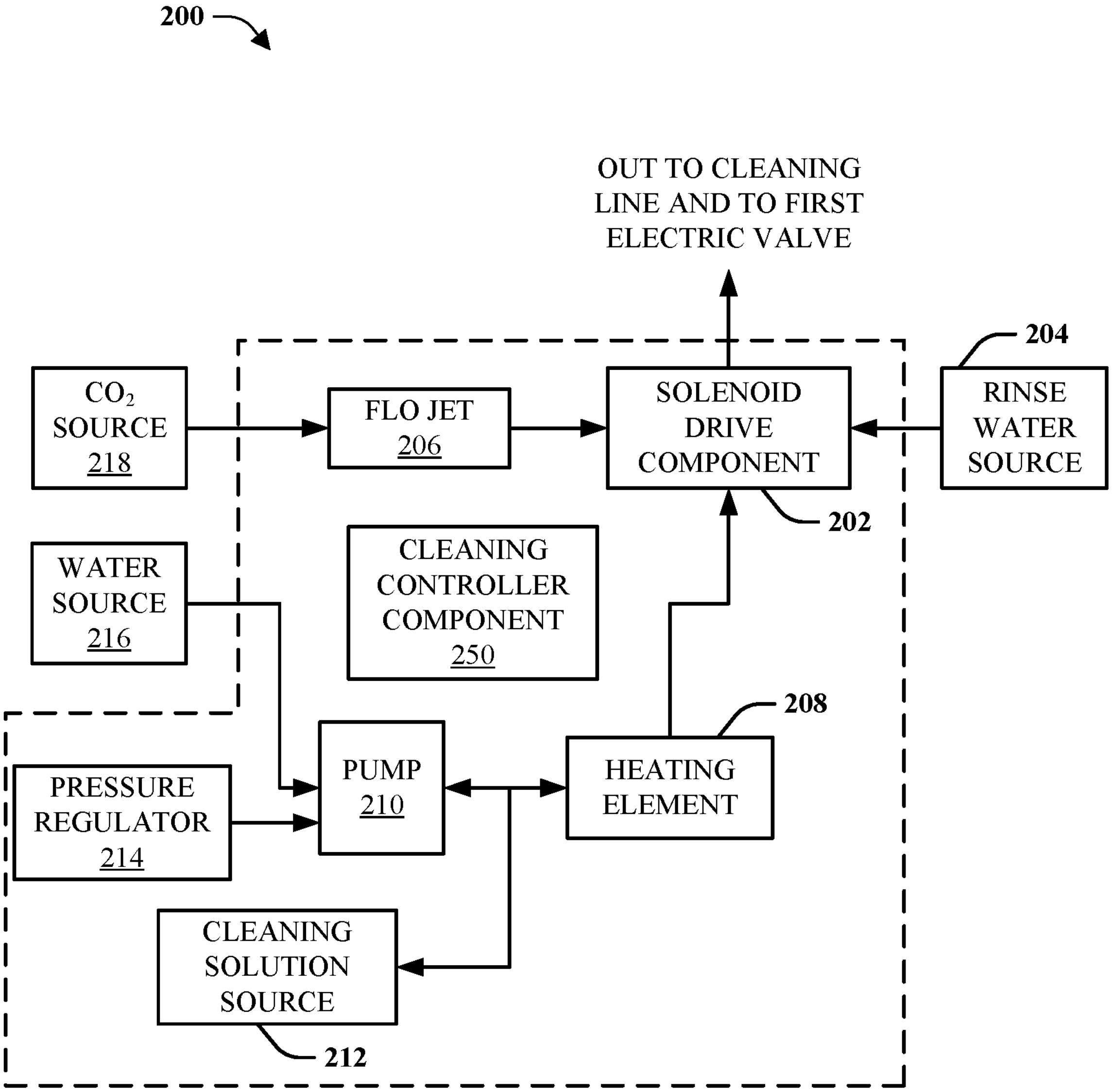
FIG. 2 is an illustration of an embodiment of a system for cleaning a beverage distribution line of a beverage distribution system.

FIG. 2 is an illustration of the cleaning system 200 for cleaning a beverage distribution line of a beverage distribution system. The cleaning system 200 can be coupled to the first electric valve 112 via the cleaning line 120. The cleaning system 200 can include a solenoid drive component 202, a rinse water source 204, a flo jet 206, a heating element 208, a pump 210, a cleaning solution source 212, a pressure regulator 214, a water source 216, and a CO2 source 218. It is to be appreciated that the rinse water source 204 and the water source 216 can be from a water source, separate water sources, or a combination thereof. The cleaning system 200 can be utilized to clean and sanitize one or more beverage distribution lines (e.g., hose 122 in FIG. 1). It is to be further appreciated that the solenoid drive component can couple to one or more cleaning lines that are respective to a beverage distribution line. In other words, the cleaning system 200 can connect to one or more cleaning lines that allow the cleaning of one or more beverage distribution lines or hoses.

The cleaning system 200 can rinse, wash, clean, sanitize, clear via flo jet 206, or a combination thereof for the hose 122. The cleaning system 200 can include a cleaning controller component 250 that can manage the cleaning system 200. In particular, the cleaning controller component 250 can manage a duration of cleaning, a frequency of cleaning, or a parameter related to the cleaning process (e.g., water temperature, cleaning solution mixture percentage, and the like). The cleaning controller component 250 can receive the second remote signal (e.g., also referred to as the cleaning control signal) in order to implement a cleaning process on one or more beverage distribution lines. The cleaning controller component 250 can be a stand-alone component (as depicted), incorporated into the evaluate component, or a combination thereof.

Figure 3:
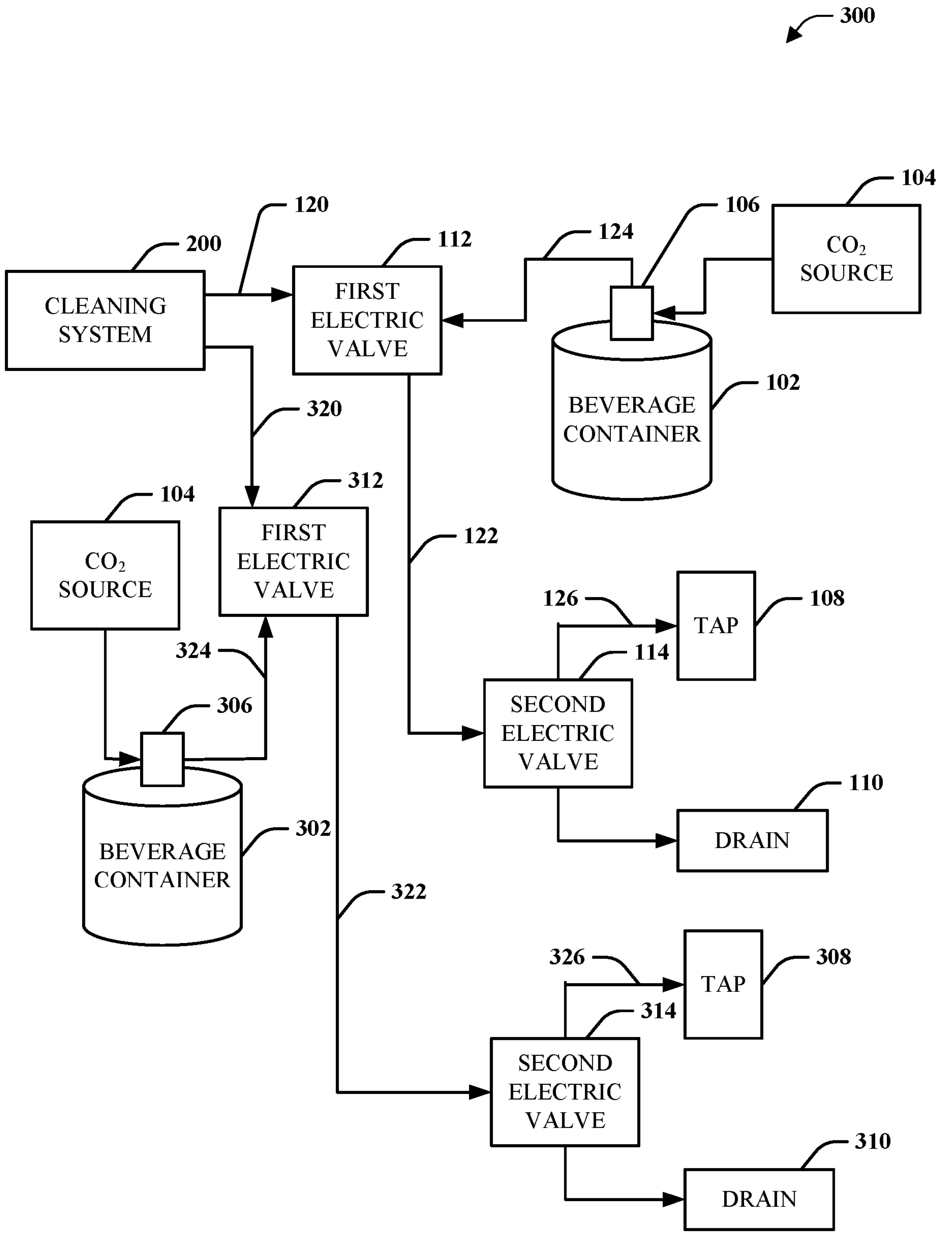
FIG. 3 is an illustration of an embodiment of a beverage distribution system that includes two or more lines for distribution of one or more beverages.

FIG. 3 is an illustration of a beverage distribution system 300 that includes two or more lines for distribution of one or more beverages. The system 300 is a multi-hose and multi-beverage container system that can be cleaned by control with a remote signal(s) with the cleaning system 200. For the sake of brevity, the admin system (e.g., admin system 118 from FIG. 1) is not illustrated and a local side is depicted. The system 300 can include the system from FIG. 1 that included the first electric valve 112, the second electric valve 114, the hose 122, the beverage container 102, the connector 106, the CO2 source 104, the tap 108, and the drain 110.

The system 300 can include a second beverage distribution line. This second beverage distribution line can include a first electric valve 312, a second electric valve 314, a hose 322 (e.g., that includes a first portion 324, a second portion 322, and a third portion 326, collectively referred to as the hose 322), a beverage container 302, the CO2 source 104, a second connector 306, a tap 308, and a drain 310. It is to be appreciated that the drain 110 and the drain 310 can be the same drain or individual drains for each respective tap. Moreover, it is to be appreciated and understood that the CO2 source 104 can be a singular source or a source for each beverage container or a combination thereof.

The first set of electric valves (e.g., first electric valve 112, second electric valve 114) can be controlled individually and independent of the second set of electric valves (e.g., the first electric valve 312, the second electric valve 314). Additionally, the cleaning process for the hose associated with the first set of valves and the cleaning process for the hose associated with the second set of valves can be controlled individually and independent of one another. Moreover, it is to be appreciated that each of the first set of electric valves and the second set of electric valves can be controlled via a remote signal, one or more remote signals, or a combination thereof. In an embodiment, control of the first set of electric valves and the second set of electric valves (as well as a cleaning processes for the hoses respective thereto) can be combined (e.g., at the same time, in sequence, among others).

Although not illustrated in FIG. 3, a controller component (e.g., controller component 116 in FIG. 1) can utilize the one or more remote signals from an admin system (e.g., admin system 118) to drive at least one of the first electric valve 112, the second electric valve 114, the first electric valve 312, the second electric valve 314, the cleaning system 200, the third connector 406, and/or a cleaning controller component (not shown but discussed in FIG. 2)

In an embodiment, the first portion 124 of the hose 122 can be a replaceable tube or hose in order to maintain integrity of such portion of the line. Similarly, the first portion 324 of the hose 322 can be a replaceable tube or hose to maintain integrity of such portion of the line. For instance, the first portion 124 and/or the first portion 324 can be approximately two (2) feet to six (6) feet of vinyl hose.

Figure 4:
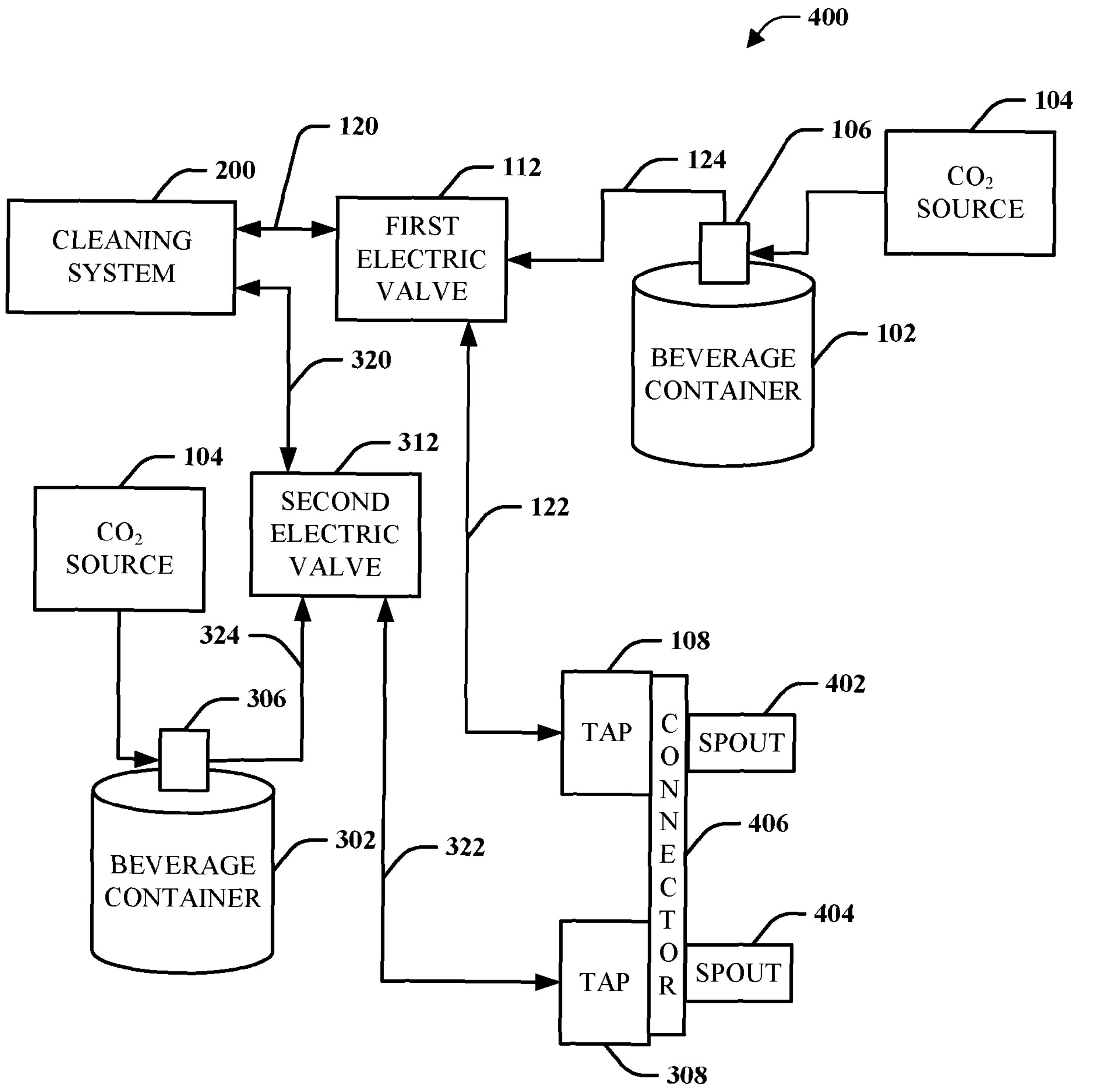
FIG. 4 is an illustration of an embodiment of a system for utilizing a first beverage line and a second beverage line for cleaning based on a remote signal.

FIG. 4 is an illustration of a system 400 for utilizing a first beverage line and a second beverage line for cleaning based on a remote signal. The system 400 can utilize one beverage distribution line to clean a disparate beverage distribution line. For instance, a first line (e.g., hose 122) and a second line (e.g., hose 322) can be utilized in a daisy-chain manner such that during a cleaning of the first line, the second line is used as a return line to a drain (not shown but illustrated in FIG. 5 as solenoid drive component drain 502) within the cleaning system 200.

Continuing with such example, the first line can then be used as a return line to the drain while cleaning the second line. For example, cleaning the first line, cleaning system passes liquid through the first line to the tap 108. A third connector 406 can be activated for a cleaning mode in which the liquid passed through the third connector 406 and through the second line to the cleaning system 200 and to the drain (e.g., solenoid drive component drain 502 in FIG. 5). Similarly, while cleaning the second line, cleaning system passes liquid through the second line to the tap 308. The third connector 406 can be activated for a cleaning mode in which the liquid passed through the third connector 406 and through the first line to the cleaning system 200 and to the drain. The third connector 406 can be controlled by a remote signal or by a physical switch. Moreover, the connector 406 can be attachable or detachable between one or more taps. In the depicted embodiment, the third connector 406 is in-line or in between a tap and a spout, wherein a spout 402 is for tap 108 and a spout 404 is for tap 308. In an embodiment, a detector can be utilized to determine whether the third connector 406 is in a cleaning mode or a dispensing mode.

Although not illustrated in FIG. 4, a controller component (e.g., controller component 116 in FIG. 1) can utilize the one or more remote signals from an admin system (e.g., admin system 118) to drive at least one of the first electric valve 112, the second electric valve 114, the cleaning system 200, the third connector 406, and/or a cleaning controller component (not shown but discussed in FIG. 2).

Figure 5:
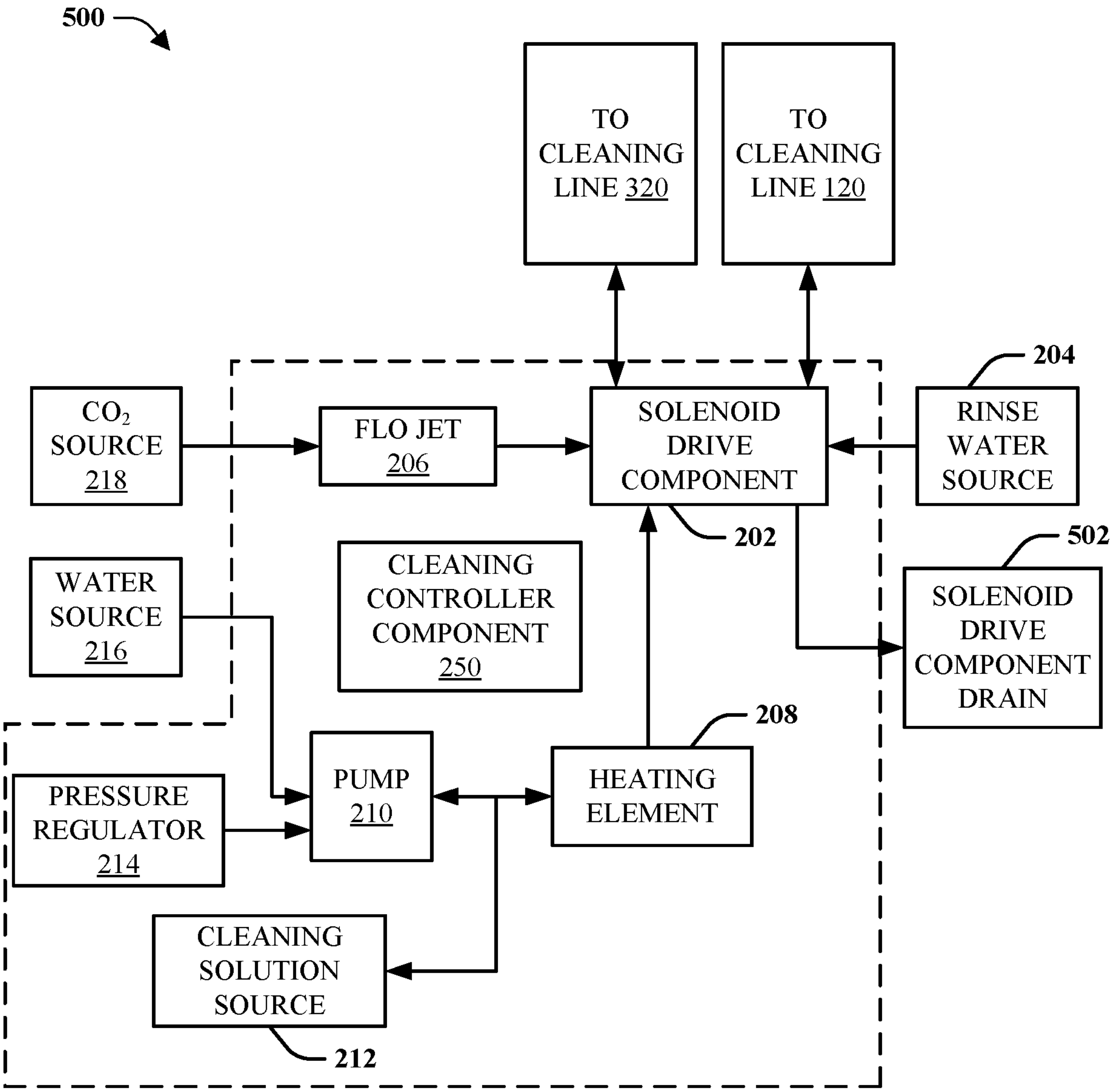
FIG. 5 is an illustration of an embodiment of a system for cleaning two or more beverage distribution lines of a beverage distribution system.

FIG. 5 is an illustration of a cleaning system 500 for cleaning two or more beverage distribution lines of a beverage distribution system. The cleaning system 500 is substantially similar to the cleaning system 200 and illustrates the cleaning system 200 for one or more beverage lines. In particular, the cleaning system 500 can connect to the cleaning line 120 and the cleaning line 320. The cleaning system 500 includes a solenoid drive component drain 502.

Figure 6:
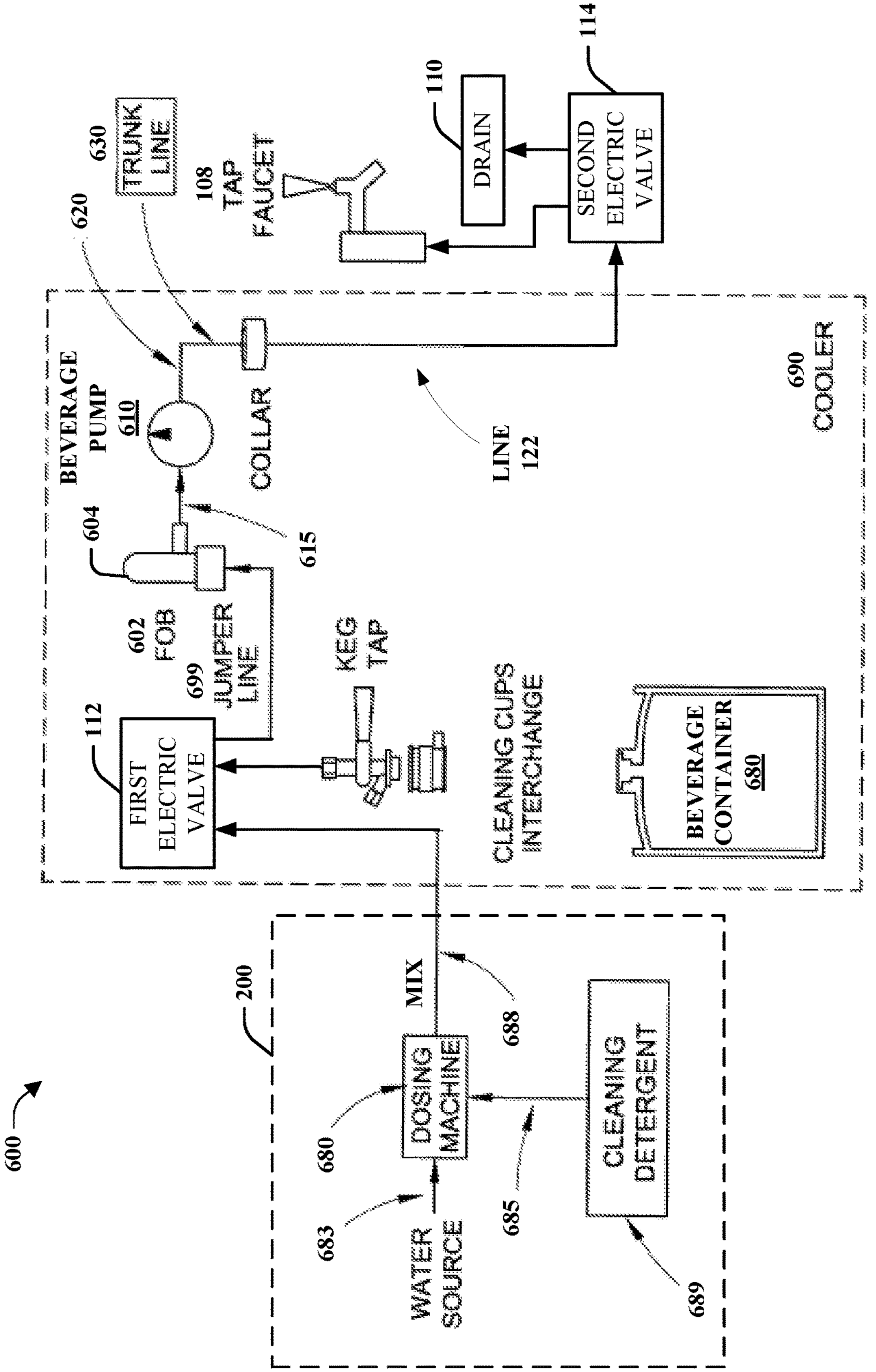
FIG. 6 is an illustration of an embodiment of a system for remote cleaning of a beverage distribution system based on one or more remote signals that communicate with one or more electric valves.

FIG. 6 is an illustration of a system 600 for remote cleaning of a beverage distribution system based on one or more remote signals that communicate with one or more electric valves. FIG. 6 is a schematic representation to further illustrate one embodiment of the method and system of the subject invention. The hydraulic machine and dosing apparatus 680 can be connected to a water source via a first line 683. A mixture of the detergent and/or disinfectant concentrate can provide the correct ratio utilizing the dosing apparatus 680. The detergent and/or disinfectant concentrates can be suitable for use in dispense systems such as beer, lager, cider, soft drinks, fruit juices, wine, and water.

As shown in FIG. 6, a jumper line 699 that is connected at its first end to the beverage coupler apparatus 604 is connected at its second end to one of the foam control detectors (FOBs) 602 employed in the method and system. FOBs are used to prevent foam after a beverage container empties and when re-tapping a new beverage container. FOBs eliminate loss of beverage when a new beverage container is tapped by only allowing solid beverage into the line. A FOB will immediately shut down the beverage flow when a beverage container empties. This eliminates foam and wasted beer after a beverage container has blown because the beverage lines stay full of beverage at all times. Most establishments pour out a pitcher or more after re-tapping a beverage before it is ready to serve. An FOB stopper is placed between a beverage container and a tap to prevent pressurized carbon dioxide from entering the line between the FOB and the tap when a beverage container empties of beverage. The FOB comprises an inlet and outlet in the base, a float used for sealing the outlet of the base when a beverage container empties, and a flow control column secured in the base and extending upwards into the inverted container. Single-handed manipulation of a handle leveraged against a mounting bracket regulates operation of the flow control column, specifically venting the pressurized carbon dioxide and releasing the float to begin delivery of beverage through the outlet. The FOB 602 is in communication with a gas/air operated pump 610 via a fourth line 615. A fifth line 620 is connected at its first end to the pump 610 and is connected at its second end to the beverage or tap (faucet).

The beverage and beverage container(s) 102 can be located in a cooler 690. The cleaning system 200 can be automatically connected and/or engaged via the first electric valve 112 and/or the second electric valve 114. The cleaning system 200 can clean lines with caustic solution at 2% or greater concentration for routine cleaning of well maintained lines or at 3% for older or more problematic lines. A non-caustic based cleaner can be utilized such as an acid based or silicate based cleaner. In such a case, the cleaning system 200 can use concentrations based on manufacturer recommendations. The cleaning system 200 can include a solution temperature of 80 degrees to 125 degrees F. during the cleaning process. If the cleaning system 200 uses an electric pump, caustic solution can be circulated through the lines at a minimum of fifteen minutes at a velocity of up to 2 gallons per minute. The cleaning system 200 can flush lines with cold water until pH matches that of tap water and no visible debris is being carried from the lines.

The cleaning concentrate will travel from the dosing apparatus 680 to the adapters via the third line 688 (also referred to as the cleaning line 120) where the concentrate then enters the jumper lines 699 and travels to the FOBs 602, whereupon the concentrate is introduced into the pumps 610 via the fourth line 615, travels from the pumps 610 via the fifth line 620 to a trunk line 630, which is enveloped by a collar device, to the outside of the cooler 690, and ultimately travels to the tap faucet 108 via the line 122 or hose 122. In an embodiment, the plurality of jumper lines 699 emanating from within the cooler 690 may be comprised of ⅜" inch vinyl tubing, which connect with a trunk line 630 that may be comprised of 7/16" inch polyvinyl tubing pre-wrapped with insulation material, which in turn connects with the tap faucet 108 via a line that may be comprised of ¼" inch vinyl spliced tubing.

The cleaning system 200 can introduce the concentrate (e.g., cleaning determine 689 and water source via line 683) into the line system. Subsequently, a lineful of cleaning concentrate is drained from the line system for a designated amount of time. The concentrate is again contained within the line system (with associated devices and apparatuses) for a designated amount of time. Once more, a lineful of cleaning concentrate is drained from the line system for a designated amount of time. The cleaning system 200 can repeat the aforementioned process if the color of the concentrate changes. Other color-changing detergents or fluids may be employed in the method and system to indicate whether the beverage lines (and accompanying apparatuses) have been cleansed of bio-film, debris and the like.

The cleaning system 200 can advance to the rinse procedure and introduces water (without any added detergents or disinfectants) into the system, utilizing the same dosing apparatus, until the cleaning concentrate is removed. The cleaning system 200 can contact a Rinse Water Test Paper with the liquid draining from the tap 108, which allows the system to ascertain whether any line cleaning concentrate remains in the line system via the video component (described in FIG. 7). The disposable test strip will turn purple/blue in color to designate the presence of cleaning fluid. It is during this portion of the method or system that the cleaning system can capture a sample of the draining liquid if, for instance, an adenosine triphosphate (ATP) hygiene monitoring system is being employed.

Figure 7:
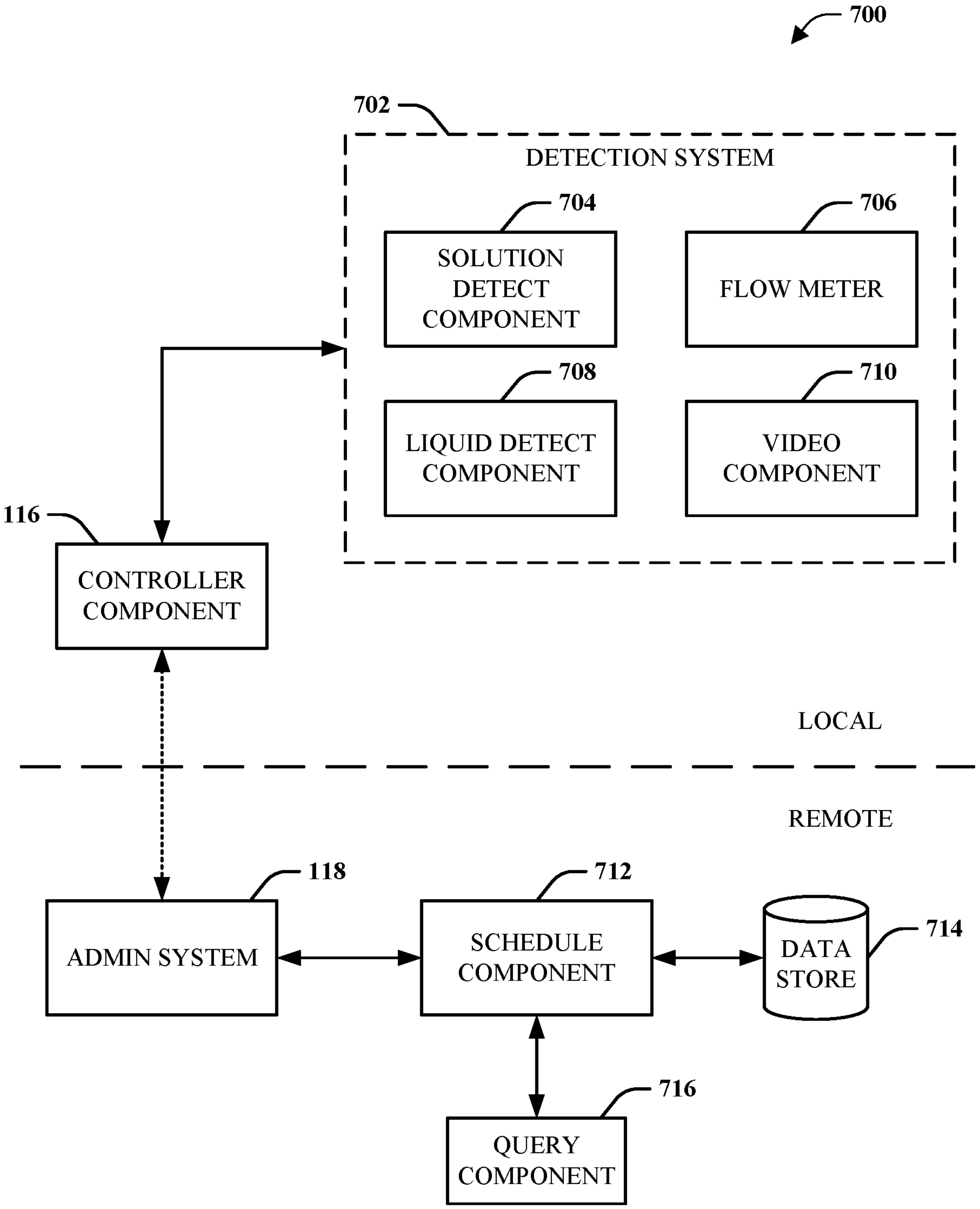
FIG. 7 is an illustration of an embodiment of a system for controlling a beverage distribution system based on a remote signal and/or a detected parameter associated with the beverage distribution system.

FIG. 7 is a system 700 for controlling a beverage distribution system based on a remote signal and/or a detected parameter associated with the beverage distribution system. The system 700 can include a detection system 702 that can detect parameters of a beverage distribution system or a beverage distribution line. In an embodiment, the detection system 702 can include a solution detect component that is configured to detect an amount of cleaning solution, an amount of solution, among others. In an embodiment, the detection system 702 can include a flow meter 706 that is configured to be connected in line or in between a beverage container and a tap, wherein the flow meter can detect a temperature, a flow rate, among others. In an embodiment, the detection system 702 can include a liquid detect component 708 that is configured to detect a presence of a portion of liquid to maintain integrity of the system and detect a leak. In an embodiment, the detection system 702 can include a video component 710 that is configured to capture media (e.g., images, still imagery, live video feed, video, audio, and the like) related to a beverage distribution system, a beverage distribution line, a line, a hose, among others.

The system 700 can further include a schedule component 712 that can be configured to manage a cleaning mode for each line, wherein a cleaning mode can include a duration of time, a frequency, a mixture for cleaning solution, a temperature of a liquid, a flow rate, a pressure, among others. It is to be appreciated that the schedule component 712 can include numerous cleaning modes and each cleaning mode can be tailored to a particular line or hose. In an embodiment, the cleaning mode is based upon at least one of a type of beverage or a brand of a beverage or a beverage distributor (e.g., beverage distributor guidelines). The schedule component 712 can include track or log data related to the scheduling of a cleaning mode such as, but not limited to, a frequency, a duration, a date, a time, a parameter of the cleaning process (e.g., temperature, flow, pressure, mixture, and the like). The system 700 can further include a query component 716 that can be configured to provide query results from a user, wherein the query and the query results relate to a cleaning mode, a beverage distribution system, or a beverage distribution line.

In an embodiment, the admin system 118 and/or the schedule component 712 stores information related to the systems 100, 200, 300, 400, 500, and/or 600 with a data store 714. The data store 714 can include information such as, but not limited to, cleaning duration for a type of beverage, cleaning duration for a line, cleaning frequency for a line, cleaning frequency for a line for a type of beverage, results from a cleaning (e.g., measurement of cleanliness, measurement of bacteria comparison, among others), cleaning duration for a brand of beverage, cleaning frequency for a line for a brand of beverage, verification of a cleaning, information related to cleaning (e.g., date, time, length, length of rinse, length of cleaning solution, among others), schedule for cleaning, parameters detected (e.g., temperature, levels of containers, flow rate, liquid detections, among others), video images (e.g., pictures, video, live feed), settings for a beverage type, settings for a beverage brand, among others, and/or a suitable combination thereof.

It is to be appreciated that the data store 714 can be, for example, either volatile memory or nonvolatile memory, or can include both volatile and nonvolatile memory. The data store 714 of the subject systems and methods is intended to comprise, without being limited to, these and other suitable types of memory. In addition, it is to be appreciated that the data store 714 can be a server, a database, a hard drive, a flash drive, an external hard drive, a portable hard drive, a cloud-based storage, and the like.

The aforementioned systems, components, (e.g., controller component, admin system, cleaning system, cleaning controller component, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 8:
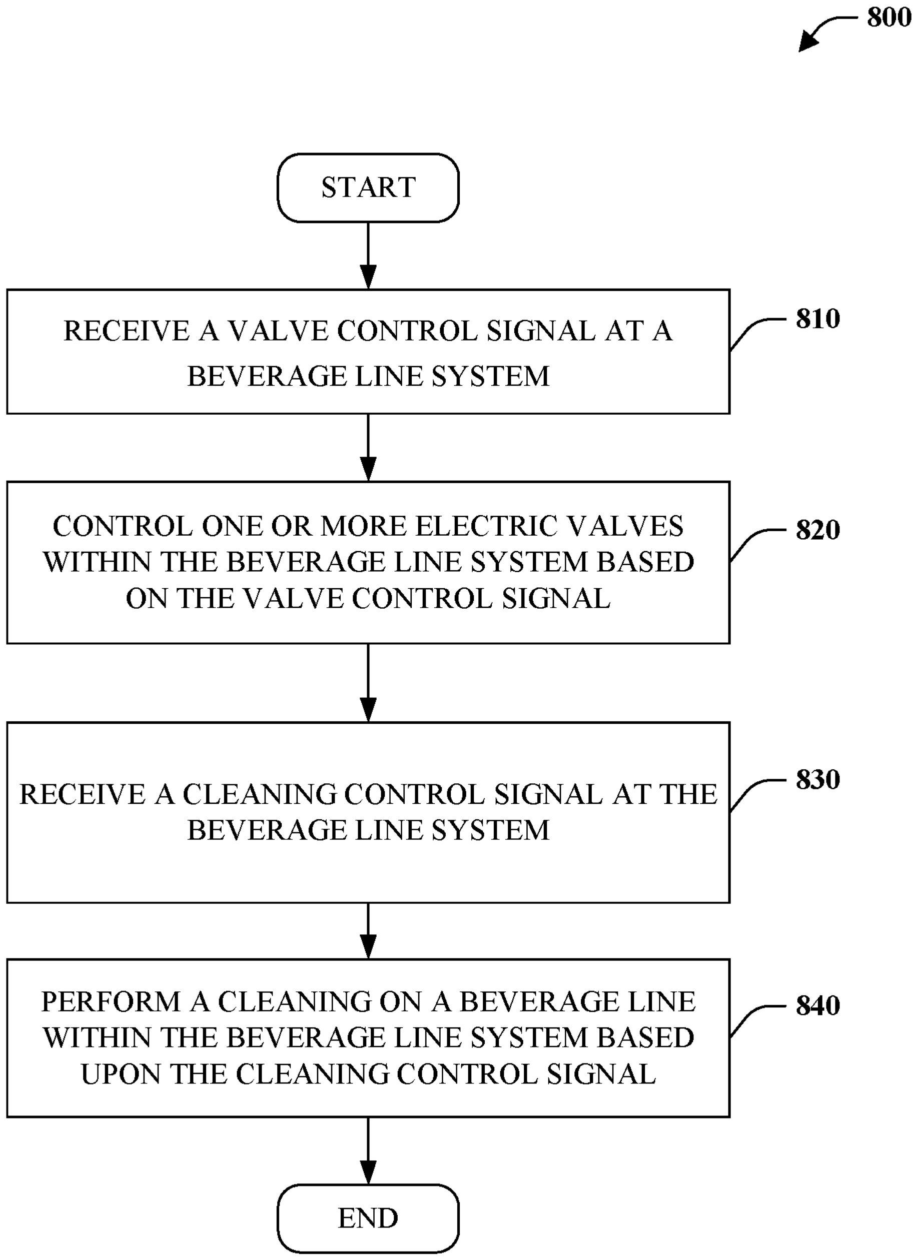
FIG. 8 illustrates a flow chart of an embodiment of a method for receiving a signal from a remote source to control a cleaning of a beverage line for a beverage distribution system.
Figure 9:
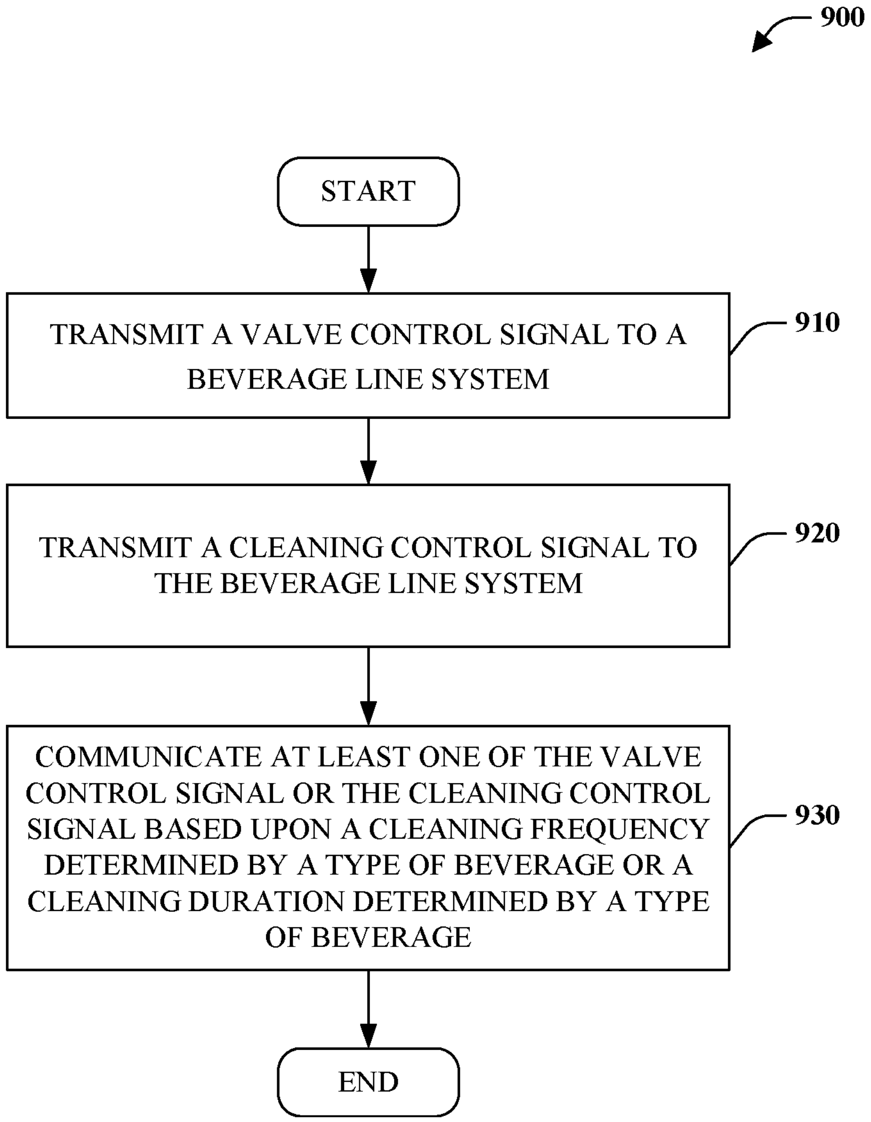
FIG. 9 illustrates a flow chart of an embodiment of a method for transmitting a signal from a remote source to control a cleaning of a beverage line for a beverage distribution system.

In view of the exemplary devices and elements described supra, methodologies that may be implemented in accordance with the disclosed subject matter will be better appreciated with reference to the flow charts of FIG. 8 and FIG. 9. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The methodologies can be implemented by a component or a portion of a component that includes at least a processor, a memory, and an instruction stored on the memory for the processor to execute.

FIG. 8 illustrates a flow chart of a method 800 for receiving a signal from a remote source to control a cleaning of a beverage line for a beverage distribution system. At reference numeral 810, a valve control signal can be received at a beverage line system (also referred to as a beverage distribution system). The valve control signal (e.g., also referred to as a remote signal) can be received at a local source and transmitted from a remote source, wherein the remote source is associated with a disparate network than a network related to the beverage distribution system. For instance, the remote source can be on a first network and the beverage distribution system can be on a second network, wherein the remote source communicates to the beverage distribution system via the Internet (and/or the first network and/or the second network). It is to be appreciated and understood that a network can be, but is not limited to, a Local Area Network (LAN), Wide Area Network (WAN), Wireless Local Area Network (WLAN), Metropolitan Area Network (MAN), Wireless Fidelity (Wi-Fi) network, among others.

At reference numeral 820, one or more electric valves within the beverage line system can be controlled based on the valve control signal. By way of example and not limitation, one or more electric valves can select between a cleaning system (e.g., via a clean line) or a dispensing system (e.g., via a hose) which enables a cleaning mode or a dispensing mode. At reference numeral 830, a cleaning control signal can be received at the beverage line system. It is to be appreciated that the cleaning control signal can include data related to a duration or a frequency for a cleaning process for a particular hose or line of the beverage line system. In an embodiment, the valve control signal and the cleaning control signal can be received from one or more transmissions or communications. In other words, the valve control signal can be received, alone or in combination with, the cleaning control signal. Additionally and/or alternatively, the cleaning control signal can be received, alone or in combination, with the valve control signal.

At reference numeral 840, a cleaning on a beverage line within the beverage line system can be performed based upon the cleaning control signal. In embodiment, the cleaning on the beverage line within the beverage line system can be performed based upon the cleaning control signal and/or the valve control signal.

FIG. 9 illustrates a flow chart of a method 900 for transmitting a signal from a remote source to control a cleaning of a beverage line for a beverage distribution system. At reference numeral 910, a valve control signal can be transmitted to a beverage line system). The valve control signal (e.g., also referred to as a remote signal) can be transmitted from a remote source and received at a local source, wherein the remote source is associated with a disparate network than a network related to the beverage distribution system. For instance, the remote source can be on a first network and the beverage distribution system can be on a second network, wherein the remote source communicates to the beverage distribution system via the Internet (and/or the first network and/or the second network). It is to be appreciated and understood that a network can be, but is not limited to, a Local Area Network (LAN), Wide Area Network (WAN), Wireless Local Area Network (WLAN), Metropolitan Area Network (MAN), Wireless Fidelity (WI-FI) network, among others.

At reference numeral 920, a cleaning control signal can be transmitted to the beverage line system. It is to be appreciated that the valve control signal and/or the cleaning control signal can be communicated and/or transmitted in one or more signals. For instance, the cleaning control signal can be communicated in a signal, the valve control signal can be communicated in a signal, and/or the cleaning control signal and the valve control signal can be communicated in a signal.

At reference numeral 930, at least one of the valve control signal or the cleaning control signal can be communicated based upon at least one of a cleaning frequency determined by a type of beverage or a cleaning duration determined by a type of beverage.

The method can further include transmitting at least one of the valve control signal or the cleaning control signal from a first network. The method can further include receiving at least one of the valve control signal or the cleaning control signal from the first network at the beverage line system, the beverage line system is on a second network.

The cleaning system of the subject disclosure can include a rinsing water source, a cleaning solution source, a solenoid drive component coupled to the cleaning line that regulates flow of at least one of the rinsing water source or the cleaning solution source, the flow is through the cleaning line to the hose to the drain, and a cleaning controller component configured to drive the solenoid drive component for management of at least one of a frequency or a duration of the rinsing water source and the cleaning solution source based upon a second remote signal. The system of the subject disclosure can include a CO2 source that provides pressure to manage flow through the line to allow the portion of beverage to flow from the beverage container to the tap.

The system can further include a schedule component that is configured to utilize the cleansing system for at least one of the frequency or the duration based on a type of beverage. The system can further include a flow meter that is configured to detect at least one of a pressure of the hose or a temperature of a portion of liquid in the hose. The system can further include a monitor component that is configured to adjust the cleaning system based upon the detected pressure or the detected temperature, wherein the adjustment is at least one of a shutdown of the cleaning system, a temperature increase, a temperature decrease, a pressure increase, or a pressure decrease. The system can further include a section of vinyl hose that connects the beverage container to the hose via a connector on each end, wherein the section of vinyl hose is replaceable to reduce bacteria growth therein. The system can further include a video component that is configured to capture media related to contents of at least one of the hose, the drain, or the cleaning line.

The cleaning system of the subject disclosure can include a rinsing water source, a cleaning solution source, a solenoid drive component coupled to the first cleaning line and the second cleaning line, the solenoid drive component includes a solenoid drive component drain, the solenoid drive component regulates flow of at least one of the rinsing water source or the cleaning solution source through the first cleaning line or the second cleaning line, and a cleaning controller component configured to drive the solenoid drive component for management of at least one of a frequency or a duration of the rinsing water source and the cleaning solution source based upon a second remote signal.

The system can further include an embodiment in which the flow is through the first cleaning line to the first hose to the first tap to the connector to the second tap to the second hose to the second electric valve to the second cleaning line to the solenoid drive component drain. The system can further include an embodiment in which the flow is through the second cleaning line to the second hose to the second tap to the connector to the first tap to the first hose to the first electric valve to the first cleaning line to the solenoid drive component drain. The system can further include a first flow meter that detects at least one of a pressure in the first hose or a temperature of a portion of liquid in the first hose and a second flow meter that detects at least one of a pressure in the second hose or a temperature of a portion of liquid in the second hose. The system can further include a monitor component that is configured to adjust the cleaning system based upon at least one of the first flow meter or the second flow meter.

The system can further include a schedule component that is configured to utilize the cleansing system on the first hose for at least one of a frequency or a duration based on a type of beverage contained in the first beverage container, wherein the schedule component is further configured to utilize the cleansing system on the second hose for at least one of a frequency or a duration based on a type of beverage contained in the second beverage container. The system can further include a watch component that is configured to track a report for each of the first hose and the second hose, the report includes a date of cleaning performed, a time of cleaning performed, and a duration of cleaning performed.

By way of example and not limitation, a hygiene monitoring system suitable for use in the beverage passageway cleaning system is an ATP Hygiene Monitoring System sold under the trademark SystemSURE Plus™ by Hyfoma of The Netherlands in the state of Gelderland. By way of example and not limitation, a cleaning detergent that may be used are PIPELINE™ PROFESSIONAL and PIPELINE GOLD™ by CHEMISPHERE UK Ltd. in Manchester, United Kingdom. It is to be appreciated that any suitable cleaning detergent can be used with sound engineering judgment. By way of example and not limitation, PIPELINE™ PROFESISONAL is a blend of potassium hydroxide, sodium hypochlorite, sodium carbonate, which is free of caustic sodium. PIPELINE GOLD™ is a blend of potassium hydroxide and sodium carbonate, which is free of caustic sodium and chlorine.

By way of example and not limitation, the pressurized cleaning detergent and water mixture (e.g., portion of rinse water source and/or portion of cleaning solution source) is heated above room temperature, and the high pressure cleaning detergent and water mixture is injected through the beverage passageway (e.g., through the cleaning line 120 and the hose 122, 126). According to other illustrative embodiments, the pressurized cleaning detergent and water mixture (e.g., portion of rinse water source and/or portion of cleaning solution source) is heated at a range of about 80° F. to about 125° F., and the high pressure cleaning detergent and water mixture is injected through the beverage passageway. According to additional illustrative embodiments, the pressurized concentrated cleaning detergent is heated at a range of about 80° F. to about 125° F., and the heated concentrated cleaning detergent is injected through the beverage passageway.

By way of example and not limitation, a suitable test strip that may be used is the PIPELINE Rinse Water Test Paper by CHEMISPHERE UK Ltd. In Manchester, United Kingdom. According to further embodiments, a suitable cleaning solution for cleaning the beverage passageways may comprise a 5% cleaning detergent in water, which may be used during the first cleaning and disinfecting of beverage or beer passageways. Thereafter, a 2.5% cleaning detergent in water is utilized. According to other illustrative embodiments, a suitable cleaning solution for cleaning the beverage passageways may comprise a 10% PIPELINE GOLD cleaning solution in water, which may be used for the first cleaning and disinfecting of recirculation and electric pump applications. Thereafter, a 5% PIPELINE GOLD cleaning solution in water may be used for the same applications.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:

a cleaning system communicatively coupled to a first network, the cleaning system configured to clean at least a portion of a beverage line; and a remote administrative system communicatively coupled to a second network, the second network being different than the first network, and the second network being communicatively coupled to the first network, wherein the cleaning system comprises a cleaning controller that is controlled by a remote signal from the remote administrative system; and wherein the remote administrative system comprises a server communicatively coupled to the second network, the server controls the operation of the cleaning system by communicating, to the first network from the second network, the remote signal to the cleaning controller.

2. The system of claim 1, wherein the cleaning system further comprises a first valve coupled in-line between a cleaning line and the beverage line to selectively allow flow to the beverage line from the cleaning line.

3. The system of claim 2, wherein the cleaning system further comprises a second valve coupled in-line between a first portion and a second portion of the beverage line to selectively allow flow from the first portion to one of a spout or a drain.

4. The system of claim 2, wherein the cleaning system further comprises:

a rinsing water source fluidly coupled to the cleaning line;

a cleaning solution source fluidly coupled to the cleaning line; and a solenoid drive component coupled to the cleaning line that regulates flow of at least one of the rinsing water source or the cleaning solution source through the cleaning line, wherein the cleaning controller is configured to drive the solenoid drive component for management of at least one of a frequency or a duration of the rinsing water source and the cleaning solution source in response to the remote signal communicated by the remote administrative system.

5. The system of claim 1, wherein the remote administrative system controls the operation of the cleaning system according to a selected cleaning mode of a plurality of available cleaning modes, wherein each cleaning mode respectively specifies settings for at least one of frequency or duration of cleaning based on a type of beverage.

6. The system of claim 5, wherein the server stores information comprising at least one of:

cleaning duration for the type of beverage, cleaning duration for the beverage line, cleaning frequency for the beverage line, or cleaning frequency for the type of beverage.

7. The system of claim 2, further comprising a flow meter configured to detect at least one of a pressure of the beverage line or a temperature of a portion of liquid in the beverage line.

8. The system of claim 2, wherein the first valve is a solenoid valve.

9. The system of claim 1, wherein the cleaning system further comprises a pump to drive one of rinsing water or cleaning solution through the cleaning line.

10. The system of claim 1, wherein the cleaning system further comprises a heater to increase a temperature of a fluid.

11. A system, comprising:

a cleaning system communicatively coupled to a first network, the cleaning system configured to clean at least a portion of a beverage line; and a remote administrative system communicatively coupled to a second network, the second network being different than the first network, and the second network being communicatively coupled to the first network, wherein the cleaning system comprises:

a first valve coupled in-line between a cleaning line from the cleaning system and a beverage line from a beverage container; and a cleaning controller;

wherein the remote administrative system comprises a server communicatively coupled to the second network, the server controls the operation of the cleaning system by communicating, to the first network from the second network, a remote signal to the cleaning controller.

12. The system of claim 11, wherein the cleaning system further comprises:

a second valve coupled in-line between a first portion and a second portion of the beverage line to selectively allow flow from the beverage container to a spout or a drain.

13. The system of claim 11, wherein the cleaning system further comprises:

a rinsing water source fluidly coupled to the cleaning line;

a cleaning solution source fluidly coupled to the cleaning line; and a solenoid drive component coupled to the cleaning line that regulates flow of at least one of the rinsing water source or the cleaning solution source through the cleaning line behind the first valve, wherein the cleaning controller is configured to drive the solenoid drive component for management of at least one of a frequency or a duration of the rinsing water source and the cleaning solution source in response to the remote signal communicated by the remote administrative system.

14. The system of claim 13, wherein the first valve is a solenoid valve configured to selectively allow flow to the beverage line from the cleaning line.

15. A remote administrative system comprising:

a server that controls the operation of a cleaning system, wherein the cleaning system comprises a cleaning controller that is controlled by a remote signal from the remote administrative system, the cleaning system communicatively coupled to a first network;

wherein the server is communicatively coupled to a second network, the second network being different than the first network, and the second network being communicatively coupled to the first network, and wherein the server is configured to control the operation of the cleaning system by communicating, to the first network from the second network, the remote signal to the cleaning controller.

16. The system of claim 15, wherein the cleaning system further comprises a first valve coupled in-line between a cleaning line and a beverage line to selectively allow flow to the beverage line from the cleaning line.

17. The system of claim 16, wherein the cleaning system further comprises a second valve coupled in-line between a first portion and a second portion of the beverage line to selectively allow flow from the first portion to one of a spout or a drain.

18. The remote administrative system of claim 15, wherein the server controls the operation of the cleaning system according to a selected cleaning mode of a plurality of available cleaning modes, wherein each cleaning mode respectively specifies settings for at least one of frequency or duration of cleaning based on a type of beverage.

19. The remote administrative system of claim 17, wherein the server stores information comprising at least one of:

cleaning duration for a type of beverage, cleaning duration for the beverage line, cleaning frequency for the beverage line, or cleaning frequency for the type of beverage.

20. The remote administrative system of claim 15, wherein the first valve is a solenoid valve.

* * * * *